Jan. 24, 1956 T. SLONCZEWSKI 2,732,496

FREQUENCY CONTROL SYSTEM

Filed Nov. 10, 1950 2 Sheets-Sheet 1

INVENTOR
T. SLONCZEWSKI
BY
H. A. Burgess
ATTORNEY

INVENTOR
T. SLONCZEWSKI
BY H. A. Burgess
ATTORNEY 2,732,496
Patented Jan. 24, 1956

2,732,496

FREQUENCY CONTROL SYSTEM

Thaddeus Slonczewski, Summit, N. J., assignor to Bell Telephone Laboratories, Incorporated, New York, N. Y., a corporation of New York Application November 10, 1950, Serial No. 195,075

10 Claims. (Cl. 250—36)

This invention relates to servo-control systems and more particularly to a servo-drive for a variable oscillator for obtaining a constant time rate of frequency progression therefrom.

It is the object of this invention to provide an automatic speed regulating servo-drive for a variable oscillator so as to obtain a constant time rate of oscillator frequency change independently of the shape of the oscillator calibration scale.

In many instances, particularly where automatic transmission measurements are sought to be obtained, it is desired to vary the frequency of a test oscillator over a wide frequency range at a constant time rate of progression; i. e. that the oscillator frequency $f$ vary linearly with time in accordance with the expression $f=F_0+kt$, where $F_0$ is the lowermost frequency of the oscillator scale, $k$ is the desired constant time rate of frequency change and $t$ the time in seconds. If the oscillator frequency scale were sufficiently uniform the oscillator frequency could be made to change linearly with time by gearing its frequency changing mechanism to a synchronous motor driven from a source of constant frequency. However, the frequency scale of oscillators designed in accordance with present techniques may depart from linearity by as much as 10 per cent, and it becomes impractical to design an oscillator with the required scale uniformity over a wide range of operating frequencies.

In accordance with the present invention a constant time rate of frequency progression is obtained from a motor driven variable oscillator independently of the nonlinearity of its frequency scale by using in combination therewith a servo-drive circuit that automatically regulates the speed of the oscillator motor drive. This circuit measures the times $t_0$, $t_1$, $t_2$ . . . $t_n$ when the oscillator frequency reaches equally spaced marker frequencies $f_0$, $f_1$, $f_2$ . . . $f_n$ and compares the timing of these frequencies against equally spaced timing signals $t'_0$, $t'_1$, $t'_2$ . . . $t'_n$ derived from a frequency sub-standard. The separation $\Delta f$ between the equally spaced oscillator marker frequencies and the separation $\Delta t'$ between the equally spaced timing signals are so chosen that the ratio $\Delta f$ divided by $\Delta t'$ equals the desired average rate of progression. The result of the comparison appears as a control voltage the amplitude of which varies with the time lag $(t_n-t'_n)$. The control voltage is applied to the grid of a variable gain stage that amplifies a 60-cycle voltage applied to the motor driving the frequency control of the oscillator. If the rate of progression of the oscillator frequency is higher than $\Delta f/\Delta t'$ the cumulative effect will be to decrease $(t_n-t'_n)$. The motor voltage will decrease and the motor will decelerate. The rate of frequency progression will decrease accordingly. Thus dynamic equilibrium will be obtained. If the rate is lower than $\Delta f/\Delta t'$ the quantity $(t_n-t'_n)$ will increase and the motor will accelerate. Thus the oscillator frequency will vary up and down between the limits $(\Delta f/\Delta)t$ and $(\Delta f/\Delta t)t+\Delta f$.

The nature of the present invention and other objects, features and advantages thereof will become more apparent from a consideration of the following detailed description and drawings.

Figure 1:
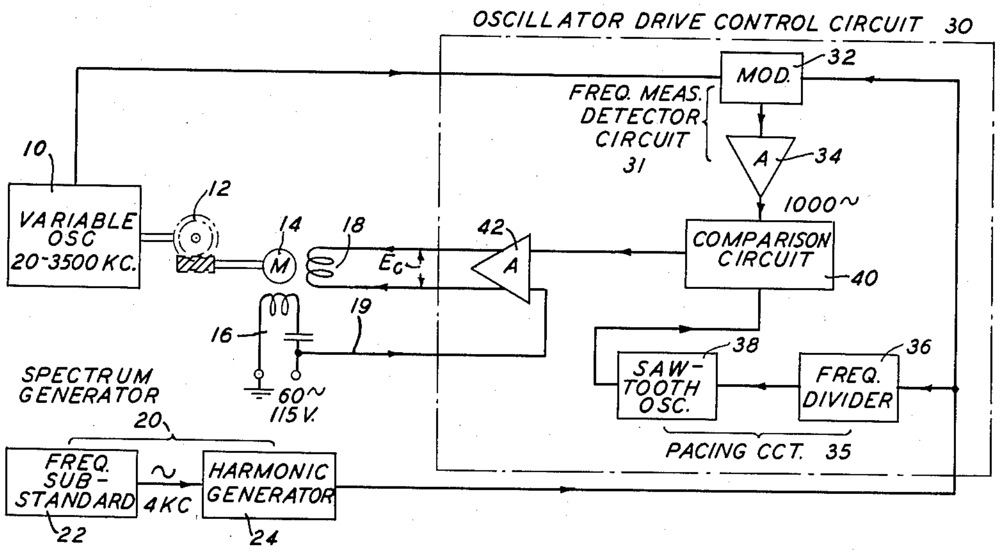
Fig. 1 is a block diagrammatic showing of the components of a servo-control system in accordance with the invention for obtaining a constant frequency progression from a variable oscillator.

The servo-control system of Fig. 1 includes, in addition to the variable oscillator 10, a spectrum generator 20 and an oscillator drive control circuit 30.

Oscillator 10 may be of the heterodyne variety shown in the copending application of H. A. Etheridge, Jr., Serial No. 195,032, filed November 10, 1950, Patent No. 2,617,855. It will be assumed that the oscillator frequency is to be swept over a frequency range extending from 20 kilocycles to 3500 kilocycles at an average rate of progression $k=12.5$ kilocycles per second. The oscillator frequency is varied by mechanically connecting its frequency changing mechanism, i. e., the shaft of the tuning condenser for example, through a low friction gear train 12 to a variable speed induction motor 14 having a pair of phase windings. One of the phase windings 16 of the motor drive is energized directly from a 115-volt alternating current 60-cycle supply source while the other phase winding 18 receives a variable 60-cycle voltage from the output of drive circuit 30.

The spectrum generator 20 comprises a crystal-controlled frequency sub-standard 22 that generates a standard frequency signal of, say, 4 kilocycles, and a harmonic generator 24 which transforms the incoming 4-kilocycle wave from 22 into a sharp pulse containing all of the harmonics of 4 kilocycles extending up to and beyond the upper limits of the oscillator operating frequency range with substantially the same amplitude. The harmonic generator may be of the type disclosed in United States Patent 2,146,091, February 7, 1939, to E. Peterson.

The oscillator drive circuit 30 comprises a frequency measuring detector circuit 31, a pacing circuit 35, a comparison circuit 40 and a power amplifier 42 that includes a variable gain stage. The frequency measuring detector circuit consists of an ordinary balanced modulator 32 having a 1000-cycle tuned amplifier output stage 34, the input to 32 being supplied from the variable oscillator 10 and the spectrum generator 20. The pacing circuit 35 is composed of a frequency divider 36 followed by a saw-tooth oscillator 38 of standard design. Frequency divider 36 consists of conventional multistage blocking oscillator counting circuits arranged to sub-divide incoming pulses derived from the standard frequency source into accurately recurring pulses whose repetition rate, determined as set forth below, controls the frequency of the saw-tooth oscillator. As shown in Fig. 1 the spectrum generator 20 energizes both the frequency measuring detector circuit and the pacing circuit. However, the pacing circuit may be energized from a different standard frequency source if desired. The comparison circuit 40, illustrated at Fig. 3 herein, is a keyed modulator of the type shown on page 399 of the article entitled "High performance modulators for servo-mechanisms" by K. E. Schreiner appearing in the Proceedings of the National Electronics Conference, 1946, volume 2. The inputs to the comparison circuit are supplied from the outputs of the frequency measuring detector circuit 31 and pacing circuit 35, respectively. The power amplifier 42 is illustrated and will be described in connection with Fig. 4 contained herein. The power amplifier is connected between the output of the comparison circuit 40 and one of the phase windings 18 of the oscillator motor drive 14. 60-cycle voltage is supplied to the input of the power amplifier over lead 19 from the local 60-cycle power source.

The detailed operation of the servo-control system of Fig. 1 will now be described in connection with the curves of Figs. 2A–2D.

Figure 2A:
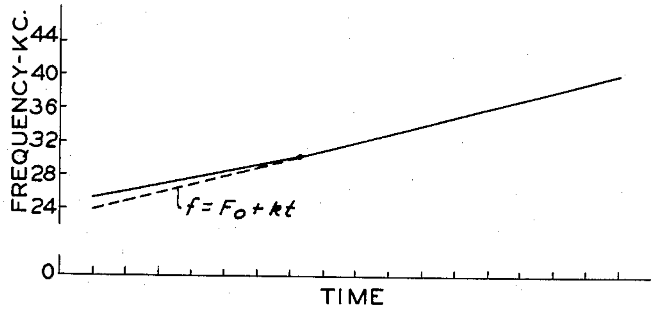
Figs. 2A through 2D are curves that are useful in explaining the theory and operation of the invention.

Fig. 2A illustrates the variable oscillator frequency variation with time as a solid line sloping upwards at approximately 12.5 kilocycles per second over a part of the oscillator frequency range from 24 to 40 kilocycles, for example. The lower portion of the frequency characteristic is slightly curved to represent a hypothetical condition where the oscillator frequency is assumed to lie above and to depart from the desired linear characteristic shown by the dotted sloping straight line $f=F_0+kt$, where $k=12.5$ kilocycles per second.

The frequency measuring detector circuit 31 of Fig. 1 functions to measure the times $t_0, t_1, t_2 \ldots t_n$ when the oscillator frequency, as varied under the control of the motor drive, reaches equally spaced frequencies $$f_0, f_1, f_2 \ldots f_n$$

and produces a succession of marker frequency pulses which may be irregularly spaced in time but which represent equally spaced frequency intervals $\Delta f=f_{n+1}-f_n$. This function is accomplished by intermodulating the changing oscillator frequency with the 4-kilocycle pulses and their harmonics in the modulator 32 and applying the modulator output to a sharply tuned amplifier circuit 34. With the output 34 of the frequency measuring detector circuit tuned to 1,000 cycles, for example, each time the oscillator frequency sweeps through a 2 kilocycle range, a sharply peaked envelope of 1,000 cycles signal energy will appear at the output of 34.

Figure 2B:
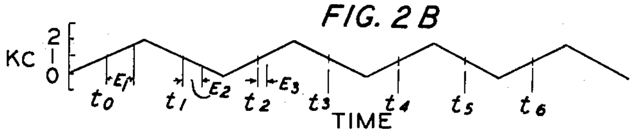

Fig. 2B illustrates the result of intermodulating the changing oscillator frequency with the 4-kilocycle pulse and its harmonics in the frequency measuring detector circuit. At any moment during the frequency change of the oscillator, its frequency is approaching or receding from a harmonic of 4 kilocycles. The variation with time of the difference frequency between the changing oscillator frequency and successive harmonics of 4 kilocycles is illustrated by the triangular "timing wave" of Fig. 2B, the frequency of which progressively varies from 0 to 2 kilocycles and then returns to 0 as the oscillator frequency recedes from one harmonic and approaches another. The times marked $t_0$, $t_1$, $t_2$, etc. indicate the instants when the modulator output reaches 1,000 cycles. The modulator output reaches 1,000 cycles twice for each harmonic of 4 kilocycles; once when the oscillator frequency is above and once when it is below the harmonic frequency nearest it.

Figure 2C:
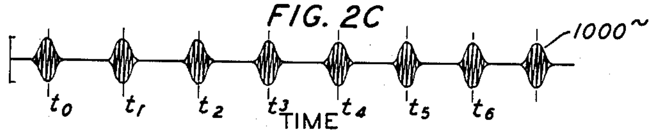

Fig. 2C illustrates the occurrence in time of the oscillator marker frequency pulses from the 1000-cycle tuned amplifier 34. A 1000-cycle envelope signal or "burst" is produced at the output of 34 each time the frequency variation of the timing wave of Fig. 2B passes the 1-kilocycle value on either the upward or downward variation of frequency or, stated otherwise, each time the oscillator frequency differs from a multiple of 2 kilocycles by 1 kilocycle.

Figure 2D:
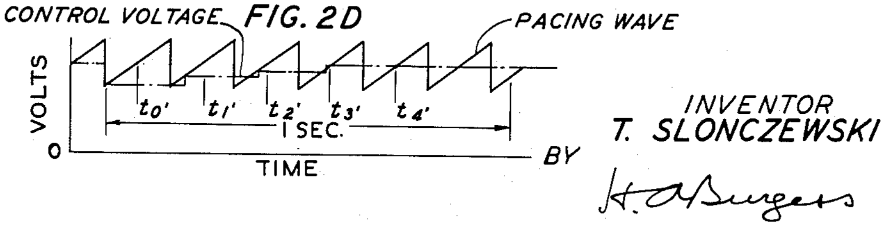

The pacing circuit provides an accurately timed series of saw-toothed waves for use as a standard of time measurements. Fig. 2D illustrates the output of the pacing circuit as a slowly rising, rapidly dropping saw-tooth voltage wave. The period and also the frequency of the saw-tooth wave is determined by substituting in the expression $\Delta f/\Delta t'=k$, the value of $\Delta f=2$ kc. and $k=12.5$ kc./sec., whence $$\Delta t'=\frac{1}{6.25} \text{ seconds}$$

With the spectrum generator 20 connected as in Fig. 1 to deliver 4-kilocycle pulses to the input of the pacing circuit, the frequency divider 36 sub-divides the incoming 4-kilocycle pulses in a ratio of 640 to 1 to obtain an accurately timed series of 6.25-cycle pulses for energizing the saw-tooth oscillator 38. The frequency of the saw-tooth wave being constant, the times marked $t'_0$, $t'_1$, $t'_2$, etc. are separated by equal time intervals $\Delta t'$ and are shown in Fig. 2D as the instants when the saw-tooth wave reaches its average value, for example.

The comparison circuit compares the timing $t_0$, $t_1$, $t_2$, etc. of the oscillator marker frequency pulses (Fig. 2C) against the timing $t'_0$, $t'_1$, $t'_2$, etc. of the average value of the saw-tooth pacing wave and produces a control voltage the amplitude of which is above the average value of the pacing voltage when the oscillator frequency is below $f=F_0+kt$ or below the average value of the pacing voltage when the oscillator frequency is above $f=F_0+kt$. The comparison function is accomplished by sampling the instantaneous value of the saw-tooth pacing wave at the precise moment of the occurrence of each of the oscillator marker frequency pulses, as is explained in the description of Fig. 3 below.

Figure 3:
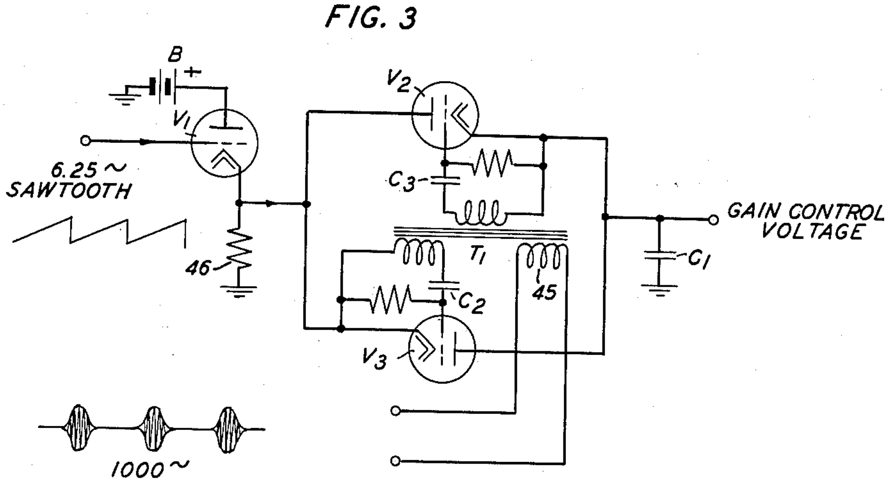
Fig. 3 is a schematic diagram of the comparison circuit used in the servo-control system of Fig. 1.

Fig. 3 is a schematic diagram of the comparison circuit 40 which comprises a cathode follower stage $V_1$ connected to a pair of triodes $V_2$ and $V_3$. The plate of $V_2$ is connected to the input circuit and its cathode is connected to the output. The corresponding elements of $V_3$ are connected in the reverse direction. The saw-tooth pacing voltage is supplied to the grid of $V_1$ while the 1000-cycle oscillator marker frequency pulses are applied to the primary 45 of a three-winding pulse transformer $T_1$. Each secondary winding of $T_1$, is connected to the cathode of one tube and through a grid leak coupling condenser $C_2$ or $C_3$ to the grid of that tube.

The gain control voltage for the power amplifier 42 (Fig. 1) is obtained by charging up the smoothing condenser $C_1$ (Fig. 3) in the output circuit to the value of the instantaneous voltage of the pacing wave at the time $t_0$, $t_1$, etc. of the arrival of each 1000-cycle marker frequency pulse. The voltage is switched on $C_1$ only at the times $t_0$, $t_1$, etc. and is switched off during the period between pulses. The condenser holds the charge it acquired last until the next switching period. To prevent rapid leaking off of the charge from the smoothing condenser the output of the comparison circuit is connected to the succeeding circuit through a cathode follower $V_4$ shown in Fig. 4.

The switching is accomplished by means of the tubes $V_2$ and $V_3$. $V_2$ conveys positive and $V_3$ negative charges to $C_1$. Normally, neither tube is conducting since the grid leak condensers $C_2$ and $C_3$ are charged negatively as explained below. When the 1000-cycle envelope pulse reaches its peak, however, its instantaneous peak voltage is at least equal to the grid leak condenser voltages and conduction takes place from plate to cathode of whichever tube has a sufficient positive plate voltage, derived from resistor 46 or condenser $C_1$ whichever has larger voltage across it.

The instantaneous positive peak voltage of the 1000-cycle marker frequency pulses is, in fact, slightly larger than the voltage on condensers $C_2$ and $C_3$. The grid of each tube, therefore, draws a positive current which charges $C_2$ and $C_3$ negatively. The condenser charge leaks out slowly enough to maintain a negative bias until the next 1000-cycle oscillator marker frequency pulse arrives.

The resultant speed control voltage appearing across $C_1$ is shown in Fig. 2D by the irregular staircase line which represents the difference between the average control voltage corresponding to the average value of the pacing wave and the point where the 1000-cycle marker frequency pulse falls on the pacing wave.

To insure proper operation of the control system of Fig. 1 the constants of the system are selected to handle a 10 per cent variation in the oscillator scale spread. The amplitude of the saw-tooth pacing wave is adjusted and made such that the required control voltage at any instant will not be higher than the peak value of the pacing wave or lower than its minimum value.

Figure 4:
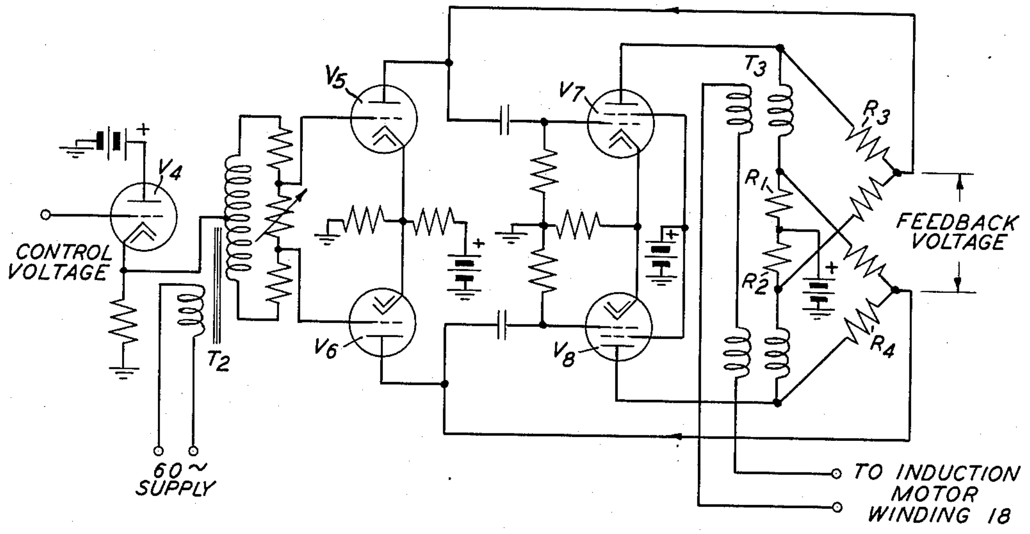
Fig. 4 is a schematic diagram of the power amplifier used in the servo-control system of Fig. 1.

Fig. 4 is a schematic diagram of the power amplifier of the oscillator drive control circuit of Fig. 1. The power amplifier includes a cathode follower input stage $V_4$, a variable gain stage $V_5$ and $V_6$ followed by a power stage $V_7$ and $V_8$, each of the latter two stages being connected in push-pull relation. 60-cycle input voltage to the amplifier is fed through transformer $T_2$. The output stage of the amplifier is arranged to feed through output transformer $T_3$ into the variable phase winding 18 of the oscillator drive motor 14. The amplifier performance is stabilized and designed to have special operating characteristics by the application of both positive and negative feedback to the power stage. This is accomplished by a feedback bridge $R_1$, $R_2$, $R_3$, and $R_4$ so arranged that the voltage drop across $R_1$ and $R_2$ provides positve feedback while the drop across $R_3$ and $R_4$ provides negative feedback.

This arrangement gives the motor-amplifier combination a favorable characteristic whereby the dependence of the motor speed on load torque is decreased. Since the feedback loop includes only one stage, its effect is moderate but is sufficient to insure satisfactory operation of the system.

Figs. 2A–2D illustrate how the oscillator change rate is corrected if the oscillator frequency is advanced in error. The lower portion of the oscillator frequency characteristic extending from about 24 kilocycles to 30 kilocycles is assumed to be advanced in error from the desired linear characteristic $f=F_0+kt$ by 1 kilocycle beginning with an oscillator frequency of 25 kilocycles. The difference frequency between the 25-kilocycle oscillator frequency and the nearest harmonic of 4 kilocycles, viz., 24 kilocycles, being 1 kilocycle, a 1000-cycle "burst" occurs at this instant indicated as $t_0$ at Figs. 2B and 2C. Had the oscillator frequency been correctly set at 24 kilocycles the 1000-cycle burst would have occurred slightly later when the oscillator frequency would have reached 25 kilocycles in its excursion from its proper 24-kilocycle setting. The 1000-cycle burst shown, therefore, is early by an error $E_1$ (Fig. 2B) and causes the amplitude of the pacing wave to be sampled near its minimum value as shown on Fig. 2D. As the oscillator frequency progressively increases, the controlling voltage determined at the first sampling tends to slow down the motor. The following samplings show successively decreasing errors $E_2$, $E_3$, which call for successively smaller correction voltages until the oscillator frequency reaches 30 kilocycles when its change rate is correct. Had the oscillator frequency originally been assumed to be delayed rather than advanced, the same general speed correcting procedure would have been followed with the correction voltages being of a sense to increase rather than decrease the speed of the oscillator motor drive.

An application of the servo-control system described herein is made in the above-referred copending patent application of H. A. Etheridge wherein the integral with respect to frequency $$\int_{f_0}^{f} F(f)\,df$$

of the measured characteristic instead of the characteristic itself is desired. In this case $F(f)$ is integrated with respect to time by electronic means, and since $f$ is made to vary linearly with respect to time by means of the subject servo-control system independently of the nonlinearity of the oscillator frequency characteristic, the substitution of $f=kt$ in the above integral $$\int_{f_0}^{f} F(f)\,df = K\int_{t_0}^{t} F(f)\,dt$$

yields the desired frequency integral in terms of the time integral multiplied by a known constant K of the system.

Another application of the subject control system is for long distance recording in measuring systems where an oscillator, positioned at one end of a long distance transmission line, is swept over its frequency range by means of a motor while the characteristic being measured is recorded graphically at the opposite end of the line on a strip of perforated paper on a toothed recording drum driven by a synchronous motor.

With conventional techniques both motors are driven from power sources of accurate frequency. Any nonlinearity in the oscillator frequency characteristic, however, will affect the linearity of the frequency scale of the graphical record and will require correction of the recorded results or a specially ruled frequency scale on the recording paper. To avoid this difficulty the servo-control system of the present invention may be employed to vary the oscillator frequency at a constant time rate of progression independently of the linearity of the oscillator frequency scale. With such an arrangement a synchronous motor driven from a constant frequency source is used at the recording end of the measuring apparatus to furnish a linear frequency scale which may be printed at the time the recording paper is manufactured.

Figure 5:
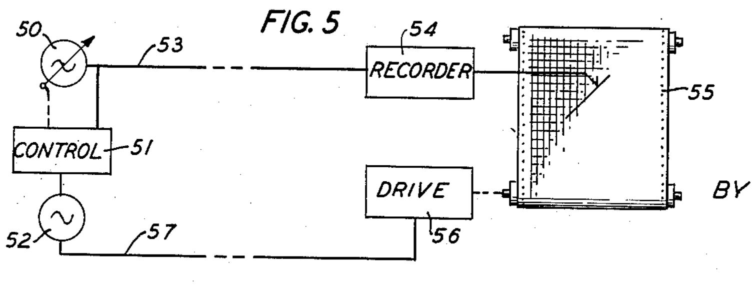
Fig. 5 is a diagram of a recording system employing the control method and means of the invention.

Such a system is illustrated in Fig. 5 for measuring a transmission line characteristic in which an oscillator 50 has its frequency swept by the control means of Fig. 1, indicated at 51 including a source 52 of nominally constant frequency. Oscillator 52 drives the pacing circuit 35 of Fig. 1 in the control circuit 51 to give any desired rate of sweep that may be desired for test purposes, and may be of less constant frequency than oscillator 22 which with harmonic generator 24 continues to supply the spectrum of known discrete frequencies for comparison. The rate of sweep of the frequency of oscillator 50 will be constant and linear if oscillator 52 has a constant frequency and will vary if deviations occur in frequency of oscillator 52 from its normal or mean frequency. The wave from oscillator 50 is sent over the line 53 under test to distant recorder 54 which makes a record of the amplitude of the received wave on a ruled paper chart 55, in order to plot the gain or loss-versus-frequency characteristic of the transmission line 53 on the chart 55. It is only necessary to drive the chart in strict accordance with the rate of change of frequency of oscillator 50 to obtain a record of amplitude variation with frequency, plotted to the correct frequency scale. For this purpose the synchronous drive 56 is operated from source 52 by current sent over the same or another line 57. In this manner any lack of linearity with time in the frequency variation of oscillator 50 is compensated for in the graph.

It is to be understood that the above-described arrangements are illustrative of the application of the principles of the invention. Numerous other arrangements may be devised by those skilled in the art without departing from the spirit and scope of the invention.

What is claimed is:

1. Apparatus for obtaining a constant time rate of frequency progression over the operating frequency range of a motor driven variable oscillator comprising in combination with said oscillator frequency spectrum generating means for deriving a standard frequency pulse and harmonics thereof equaly distributed throughout said oscillator operating frequency range, a frequency measuring detector circuit, means to impress thereon waves from said oscillator and also said harmonics to cause waves of difference frequencies to appear in the output of said detector, means to select difference frequency waves to serve as oscillator marker frequencies said selective means being tuned to a fixed frequency, means for producing accurately recurring timing signals equally separated in time, means for comparing the timing of said oscillator marker frequencies against said timing signals and speed-regulating motor control means actuated by a voltage from said time comparing means the amplitude of which voltage varies with the time lag between each of said marker frequencies and said timing signals.

2. Apparatus for obtaining a constant time rate of frequency progression over the operating frequency range of a variable oscillator comprising in combination therewith a variable-speed motor-drive mechanically connected to the frequency changing mechanism of said oscillator, frequency spectrum generating means for deriving a standard frequency pulse and harmonics of said pulse equally distributed throughout said oscillator operating frequency range, frequency measuring detector means controlled by the combined outputs of said oscillator and said spectrum generating means for producing marker frequencies at equally spaced frequency intervals during the frequency progression of said oscillator, said means comprising modulating means and tuned output circuit means tuned to a fixed frequency, means controlled by said frequency spectrum generating means for producing accurately recurring timing signals equally separated in time by the ratio of the frequency spacing between said oscillator marker frequencies to said constant time rate of frequency progression, means for comparing the timing of said oscillator marker frequencies against said timing signals and speed-regulating motor control means actuated by a voltage from said time comparing means the amplitude of which varies with the time lag between each of said oscillator marker frequencies and said timing signals.

3. Apparatus for obtaining a constant time rate of frequency progression over the operating frequency range of a motor driven variable oscillator comprising in combination with said oscillator frequency spectrum generating means for deriving a standard frequency pulse and harmonics thereof equally distributed throughout said oscillator operating frequency range, frequency measuring detector means including modulating means controlled by the combined outputs of said oscillator and said spectrum generating means and tuned output circuit means tuned to a fixed frequency for producing marker frequencies at equally spaced frequency intervals during the frequency progression of said oscillator, frequency dividing means controlled by said spectrum generating means, saw-tooth generating means energized by said frequency dividing means for producing a periodically recurring saw-tooth voltage wave the frequency of which is equal to the ratio of said constant time rate of frequency progression to the frequency spacing between said oscillator marker frequencies, and comparison means for sampling the instantaneous value of said saw-tooth voltage wave at the moment of occurrence of each of said marker frequency indications to obtain a speed-regulating motor control voltage the amplitude of which varies with the time lag between each of said marker frequencies and a particular point on said sawtooth voltage wave.

4. Apparatus for obtaining a constant time rate of frequency progression over the operating frequency range of a variable oscillator comprising in combination therewith a variable-speed motor-drive mechanically connected to the frequency changing mechanism of said oscillator, frequency spectrum generating means including a standard frequency source and a harmonic generator for deriving a standard frequency pulse and harmonics of said pulse equally distributed throughout said oscillator frequency range, frequency measuring detector means controlled by the combined outputs of said oscillator and said frequency spectrum generating means for producing marker frequencies at equally spaced frequency intervals during the frequency progression of said oscillator, said means including modulating means and output circuit means fixedly tuned to one-quarter the frequency separation between said harmonics, frequency dividing means controlled by said spectrum generating means, saw-tooth wave generating means energized from said frequency dividing means to produce a periodically recurring saw-tooth voltage wave the frequency of which is equal to the ratio of said constant time rate of frequency progression to the frequency spacing between said oscillator marker frequencies, comparison means comprising a keyed modulator connected to receive said oscillator marker frequency indications and said saw-tooth voltage wave and power amplifying means connected to supply the output of said comparison means to said oscillator motor drive.

5. In combination an oscillation generator, control means for sweeping the frequency of said oscillator back and forth over a given range of variation, means to generate waves of a series of frequencies, spaced from one another within said range, means to generate a cyclic voltage wave to provide a measured succession of time intervals, means to compare the times of arrival of the frequency of the waves from said oscillator at said spaced frequencies against the measured succession of time intervals, to obtain time differences representative of the frequency errors in the wave from said oscillator, means to translate said time differences into voltage differences, and means to modify the action of said control means in accordance with said voltage differences to compensate said errors.

6. In combination with an oscillation generator and control means for continuously sweeping the frequency of generated waves between given extreme limits, means for controlling the rate of sweep of said frequency to correspond to a prescribed rate comprising means to generate waves of discrete frequencies spaced apart by definite amounts within the range defined by said limits, timing means for indicating the times at which the oscillator frequency reaches a definite relation to each of these spaced frequencies, means to produce time signals at prescribed times, means to compare the indications by said timing means with said signals to obtain time differences, means to translate said time differences into voltage differences and means to modify the operation of said control means in accordance with said voltage differences.

7. In a sweep frequency oscillator circuit, control means to produce a nominally linear rate of sweep of the frequency of said oscillator over a given range, means to modify the action of said control means to change the rate of sweep, a comparison circuit for comparing the times at which the oscillator frequency arrives at each of a set of equally spaced frequencies within said range against a set of uniformly separated times, to detect differences in compared times, means to translate the detected time differences into voltages, and means to apply said voltages to said modifying means to increase the linearity of sweep.

8. A sweep frequency oscillator having a control circuit for causing the oscillator frequency to progress at a nominally constant rate repeatedly over a given range, means to generate waves having respective individual frequencies in a fixed succession throughout said range, means to produce a wave which in successive time intervals has linearly sloping voltage portions with time, modulator means coupled to said oscillator and to said generating means for producing pulses occurring at the instants when the oscillator frequency has a predetermined relation to the nearest adjacent one of said succession of frequencies of said generated waves, means to sample the voltage of said produced wave at the instants of occurrence of said pulses, and means to modify the action of said control circuit to vary the rate of progression of the oscillator frequency in proportion to the magnitude of the sampled voltage.

9. A generator of electrical alternating current whose frequency is varied continuously with time at a substantially constant rate which comprises means for generating said current, means for varying the frequency of said current at an arbitrary rate, means for measuring the deviations in time of the generation of a multiplicity of values of frequency by said generating means from the prescribed times of generation of said frequencies by said generating means as said frequency of said current is varied over its range of variation comprising a timing voltage wave generator, and means for adjusting said rate of variation of said frequency in accordance with said deviations in time.

10. In combination with an oscillation generator and control means for continuously sweeping the frequency of generated waves between given extreme limits, means for controlling the rate of sweep of said frequency comprising means for generating waves of discrete frequencies spaced apart within the range defined by said limits under control of a constant frequency oscillator, timing means for indicating the times at which the frequency of said oscillation generator reaches a definite relation to each of these said spaced frequencies, means to produce time signals under control of a second oscillator, means to compare the indications by said timing means with said signals to obtain time differences, means to translate said time differences into voltage differences, means to modify the operation of said control means in accordance with said voltage differences, means to supply said generated waves of continuously swept frequencies to a recorder of the type using coordinate section paper and recording stylus, and means to move said paper under control of waves from said second oscillator whereby variations in linearity with time of sweep in frequency of said generated waves are compensated by similar variations in movement of said paper.

References Cited in the file of this patent

UNITED STATES PATENTS

| | | |
|---|---|---|
| 1,450,966 | Affel | Apr. 10, 1923 |
| 2,005,153 | Marks | June 18, 1935 |
| 2,017,894 | Cady | Oct. 22, 1935 |
| 2,295,615 | Tucker | Sept. 15, 1942 |
| 2,324,077 | Goodale | July 13, 1943 |
| 2,424,833 | Korman | July 29, 1947 |
| 2,503,105 | Freas | Apr. 4, 1950 |
| 2,610,228 | Devine | Sept. 9, 1952 |
| 2,629,829 | Daly | Feb. 24, 1953 |